(12) United States Patent
Ceresoli

(10) Patent No.: US 12,483,761 B2
(45) Date of Patent: Nov. 25, 2025

(54) TECHNOLOGIES FOR COMMUNICATING AN ENHANCED EVENT EXPERIENCE

(71) Applicant: Pacers Basketball, LLC, Indianapolis, IN (US)

(72) Inventor: Carl Ceresoli, Zionsville, IN (US)

(73) Assignee: PACERS BASKETBALL, LLC, Indianapolis, IN (US)

( * ) Notice: Subject to any disclaimer, the term of this patent is extended or adjusted under 35 U.S.C. 154(b) by 17 days.

(21) Appl. No.: 18/206,119

(22) Filed: Jun. 6, 2023

(65) Prior Publication Data

US 2023/0396858 A1 Dec. 7, 2023

Related U.S. Application Data

(63) Continuation-in-part of application No. 17/175,617, filed on Feb. 13, 2021, now Pat. No. 11,678,027.
(Continued)

(51) Int. Cl.
*H04N 21/81* (2011.01)
*H04N 21/233* (2011.01)
(Continued)

(52) U.S. Cl.
CPC ....... *H04N 21/8133* (2013.01); *H04N 21/233* (2013.01); *H04N 21/23418* (2013.01);
(Continued)

(58) Field of Classification Search
CPC ............ H04N 21/8133; H04N 21/233; H04N 21/23418; H04N 21/472; H04N 21/8106; H04N 21/8146

See application file for complete search history.

(56) References Cited

U.S. PATENT DOCUMENTS 10,467,729 B1 * 11/2019 Perera .................. G06T 3/4046
2011/0063503 A1    3/2011 Brand et al.
(Continued)

FOREIGN PATENT DOCUMENTS

WO     2015148693 A1   10/2015

OTHER PUBLICATIONS

International Search Report and Written Opinion in PCT/US21/18053, International Searching Authority, Dated May 4, 2021, pp. 1-16.
(Continued)

*Primary Examiner* — Sumaiya A Chowdhury
(74) *Attorney, Agent, or Firm* — ICE MILLER LLP

(57) ABSTRACT

One or more devices, systems, methods, may implement one or more techniques to provide sporting event content to a consumer. One or more techniques may receive a request for enhanced content from a consumer, wherein the request specifies desired real-time inputs to enhance the consumer's sporting event experience. One or more real-time audio highlights, video clips, and/or statistical insights is generated based on the sporting event. A storage location retrieves real-time inputs requested by the consumer and synchronizes them with a monitored broadcasted event. A network connects a content access device and the storage location, enabling transmission of the synchronized enhanced content from the storage location to the content access device in real-time during the sporting event.

20 Claims, 12 Drawing Sheets

Related U.S. Application Data

(60) Provisional application No. 62/976,301, filed on Feb. 13, 2020.

(51) Int. Cl.
  *H04N 21/234* (2011.01)
  *H04N 21/472* (2011.01)

(52) U.S. Cl.
  CPC ....... *H04N 21/472* (2013.01); *H04N 21/8106* (2013.01); *H04N 21/8146* (2013.01)

(56) References Cited

U.S. PATENT DOCUMENTS

| | | |
|---|---|---|
| 2013/0205321 A1 | 8/2013 | Sinha et al. |
| 2014/0337346 A1 | 11/2014 | Barthel et al. |
| 2016/0247537 A1 | 8/2016 | Ricciardi |
| 2016/0323612 A1 | 11/2016 | Stewart |
| 2018/0121996 A1 | 5/2018 | Gandhi |
| 2019/0030435 A1 | 1/2019 | Dishman |
| 2019/0354765 A1* | 11/2019 | Chan ................. H04N 21/2187 |

OTHER PUBLICATIONS

Office Action issued in Canadian Patent Application No. 3, 187,805, Canadian Intellectual Property Office, Dated Sep. 21, 2023.
CIPO Examination Report, dated Jun. 20, 2024.
European Patent Office Search Report, dated Feb. 7, 2024.

* cited by examiner

TECHNOLOGIES FOR COMMUNICATING AN ENHANCED EVENT EXPERIENCE

RELATED APPLICATION

This application is a continuation-in-part (CIP), which claims the benefit of U.S. Ser. No. 17/175,617, titled TECHNOLOGIES FOR COMMUNICATING AN ENHANCED EVENT EXPERIENCE, filed on Feb. 13, 2021, which claims the benefit of U.S. Provisional Application No. 62/976,301, filed on Feb. 13, 2020. The disclosure of these prior applications are incorporated herein by reference in their entirety for all purposes.

BACKGROUND

In many sports arenas, attendees can enjoy the live action of one or more sporting events, along with the clamor generated by the multitudes of fellow enthusiasts who have traveled to the arena to enjoy the sporting spectacle in-person.

Fans attending the sporting event live and in person may have the benefit of hearing a number of sounds and/or seeing a number of images that perhaps sports fans watching the sporting event remotely (e.g., via broadcast television, satellite television, cable television, Internet streaming, etc.) and/or in delayed time (e.g., a rebroadcast, a recording, etc.) may not be able to observe and/or hear—let alone enjoy.

For example, sports fans physically attending a sporting event in an arena may hear and/or observe players voices/sounds, coaches' voices and gestures, sporting officials' voices and gestures, local arena announcements, and or arena alerts pertaining to the sporting event, etc.

The sporting fans that monitor the sporting event remotely, and/or in a time-delayed fashion, might not be able to hear and/or observe all of those same sights and sounds. Indeed, depending on their seating placement, perhaps not all sports fans attending the sporting event live and in person in the arena may hear and/or observe all of the aforementioned sights and sounds that occur before, during, and somewhat after the sporting event.

SUMMARY

The present disclosure includes disclosure of one or more devices, systems, and/or methods, that may implement one or more techniques to provide a sporting event content application. The sporting event content application may enable an enhanced audio and/or an enhanced video experience for televised sporting events, perhaps for example though an in-home smart speaker, mobile device (e.g., smart phone), a personal computer (PC), a gaming console, and/or a virtual reality (VR) headset.

The present disclosure includes disclosure of one or more techniques that may leverage cloud-based time encoded content and/or an in-device microphone array to identify and/or align (e.g., time align) televised content, perhaps for example regardless of broadcast delay and/or a digital video recorder (DVR) delay. Perhaps for example once a (e.g., real time, time delayed, and/or recorded and later replayed) televised sporting event and speakers and/or video device (e.g., in-home speakers and/or mobile smart device) are in sync, a sporting event enhanced audio and/or video experience may be delivered to a requesting (e.g., subscribing) consumer. The sporting event content may augment the broadcast of the sporting event for the consumer.

The present disclosure includes disclosure of at least one device for providing an event content stream. In one technique, such a device comprises a microphone; a speaker; a transceiver; and a processor, the processor configured at least to receive an audio feed via the microphone, assign a time code to the audio feed, receive an event content stream from a remote storage location, the event content stream corresponding at least to the audio feed, and the event content stream being time aligned based at least on the time code, and provide at least a part of the event content stream via at least the speaker. In one technique, such a device comprises a display, and the processor is configured to provide at least a part of the event content stream via at least the display. In one technique, such a device comprises a camera; and a display, and the processor is configured to receive a video feed via the camera, the event content stream further corresponding to the video feed; and provide at least a part of the event content stream via at least the display. In one technique, event content stream comprises an advertisement for a product, and the processor is configured to receive a second audio feed via the microphone, the second audio feed comprising at least an order for the product; and deliver the order to an order processor.

The present disclosure includes disclosure of at least one method for communicating an enhanced event experience. In one technique, such a method comprises the steps of obtaining, with a first device, broadcast information from a broadcast emitted from a second device; comparing the broadcast information to a time encoded recording; synchronizing the time encoded recording with the broadcast information; transmitting enhanced content to the first device, the enhanced content being based at least on the time encoded recording; and delivering the enhanced content by way of the first device, the enhanced content being in time alignment with the broadcast emitted from the second device. In at least one such method, the broadcast information is based at least on an audio feed of the broadcast. In at least one such method, the enhanced content comprises at least audio content. In at least one such method, the broadcast information is based at least on a video feed of the broadcast. In at least one such method, the enhanced content comprises at least video content. In at least one such method, the enhanced content comprises at least one advertisement. In at least one such method, the broadcast is of a sporting event. In at least one such method, the enhanced content comprises at least audio captured at the sporting event. In at least one such method, the method comprises the steps of identifying undesirable material in the enhanced content; and eliminating the undesirable material.

The present disclosure includes disclosure of at least one device for providing event content. In one technique, such a device comprises a memory, the memory comprising at least time encoded event content; a processor, the processor configured at least to receive a time encoded media sample; retrieve the time encoded event content; compare the time encoded event content to the time encoded media sample; and produce an event content stream, the event content stream comprising at least a portion of the time encoded event content that is selected based at least on time alignment with the time encoded media sample. In one such technique, the event content stream comprises at least one advertisement. In one such technique, the event content stream comprises at least one advertisement for a product, and the processor is further configured to receive an order for the product; and deliver the order to an order processor. In one such technique, the processor is configured to identify undesirable material in the event content stream; and eliminate the undesirable material, which may be obscene language.

The present disclosure includes additional aspects that can significantly enhance the sporting event content application, offering users a more immersive and captivating experience. In addition to the broadcast, the system can integrate additional real-time inputs from diverse sources, such as AI services and systems specifically designed to create audio, video, or statistical highlights. These sources can originate from on-site event sources or be independently produced, enabling a wide range of real-time content possibilities. For instance, the system can incorporate real-time data from player tracking systems, sensor networks, or social media platforms. This integration of real-time inputs provides an opportunity to augment the overall experience delivered to end-users, particularly when precisely aligned with the monitored broadcasted event.

To address latency challenges, the present disclosure introduces techniques that can revolutionize the way sporting events are experienced. In certain embodiments, the system can leverage AI chatbots and sophisticated algorithms to generate real-time commentary. By integrating selected broadcast content with these additional real-time inputs, such as AI-powered real-time stats systems, the system can produce insightful AI-driven commentary, augmented reality features, and AI-enhanced audio. Through the analysis of real-time data, the AI algorithms can generate personalized and dynamic commentary, enhancing the value and engagement of the user experience. For example, the system can integrate AI algorithms that analyze player performance metrics, game strategies, or historical data to provide real-time insights and commentary. Additionally, it can incorporate AI-driven computer vision technologies to identify key moments, such as goals, fouls, or impressive plays, and generate corresponding highlights in real-time.

The incorporation of these real-time inputs, combined with AI-driven commentary, enhances the overall experience of the sporting event content application. In certain embodiments, users can access enriched content, including highlights, real-time analysis, personalized commentary, and augmented reality features, seamlessly integrated with the televised broadcast. This integration provides a comprehensive and immersive experience, empowering users to engage with the sporting event in an interactive and captivating manner. The system can dynamically present statistics, such as player rankings, team performance trends, or real-time scores, alongside the broadcast, enhancing the viewers' understanding and enjoyment of the game. Additionally, it can offer interactive features, such as live polls, trivia, or predictions, allowing users to actively participate and compete with other fans in real-time.

By leveraging AI capabilities, the sporting event content application brings a new level of engagement to sports entertainment. The integration of real-time inputs and AI-driven commentary allows users to delve deeper into the intricacies of the sporting event, fostering a connection and appreciation for the game. This transformative approach shifts the viewer experience from passive observation to active participation, providing a personalized and dynamic experience. The present disclosure reshapes the landscape of sporting event experiences, offering fans an innovative platform to interact with and enjoy live broadcasts.

Other examples of real-time inputs that can be integrated into the system and method can include live social media feeds showcasing fan reactions, viral posts, or social media interactions related to the event, real-time weather updates, stadium conditions, or other environmental factors that can influence the game, sensor data from equipment or wearables used by athletes, providing insights into biometrics, motion tracking, or performance metrics, etc. Additional examples of AI-driven enhancements and features that may be incorporated into the systems and methods can include (but are not limited to): AI-powered language processing to generate real-time multilingual commentary or provide translations for international broadcasts; virtual and augmented reality elements that overlay graphics, player statistics, or virtual replays onto the live broadcast; advanced audio processing techniques to enhance crowd noise, capture ambient sounds, or provide immersive 3D audio experiences, etc.

Overall, these examples demonstrate the flexibility and innovation that the system can achieve by incorporating various real-time inputs and leveraging AI technologies, delivering a dynamic and enriched sporting event experience. The present disclosure includes disclosure of additional aspects to integrate real-time AI services, independent sources of content, and AI-driven commentary and enhancements, contributing to the advancement of the sporting event content application. These innovations provide an enriched and immersive experience, enabling users to stay updated, engaged, and entertained throughout the sporting event, making it a truly remarkable and interactive experience.

In other aspects, the system can integrate real-time social media feeds related to the sporting event. In some embodiments, the system and method can monitor popular platforms (e.g., TWITTER, INSTAGRAM, FACEBOOK, etc.) for trending topics, fan reactions, player updates, and the like. In some embodiments, the systems and methods can monitor social media inputs in real-time, and generate audio or video highlights showcasing notable fan moments, viral posts, or social media interactions. Adding a social element to the sporting event experience can also provide users with unique and engaging content derived from real-time social media conversations.

Some embodiments can include additional aspects that leverage AI-powered statistical analysis tools to process real-time data from the sporting event. In some embodiments, the system can monitor data feeds such as player statistics, game progress, and historical records, and can generate statistical highlights and insights in real-time. In a non-limiting example, the system can provide dynamic graphics overlaying on-screen statistics, such as player performance trends, team comparisons, or historical milestones. Such real-time statistical highlights can enhance the viewers' understanding of the game and provide deeper insights into the players' performances.

Some embodiments can include additional aspects that integrate real-time inputs from expert analysts or commentators who are remotely connected to the event. These analysts can provide live commentary and insights based on their expertise and analysis of the ongoing game. Through audio or video streaming, viewers can receive personalized and knowledgeable commentary that adds depth and context to the sporting event. The system can also dynamically incorporate relevant statistics, player profiles, or historical data to augment the commentary, enriching the viewers' understanding and engagement with the game.

BRIEF DESCRIPTION OF DRAWINGS

The embodiments and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
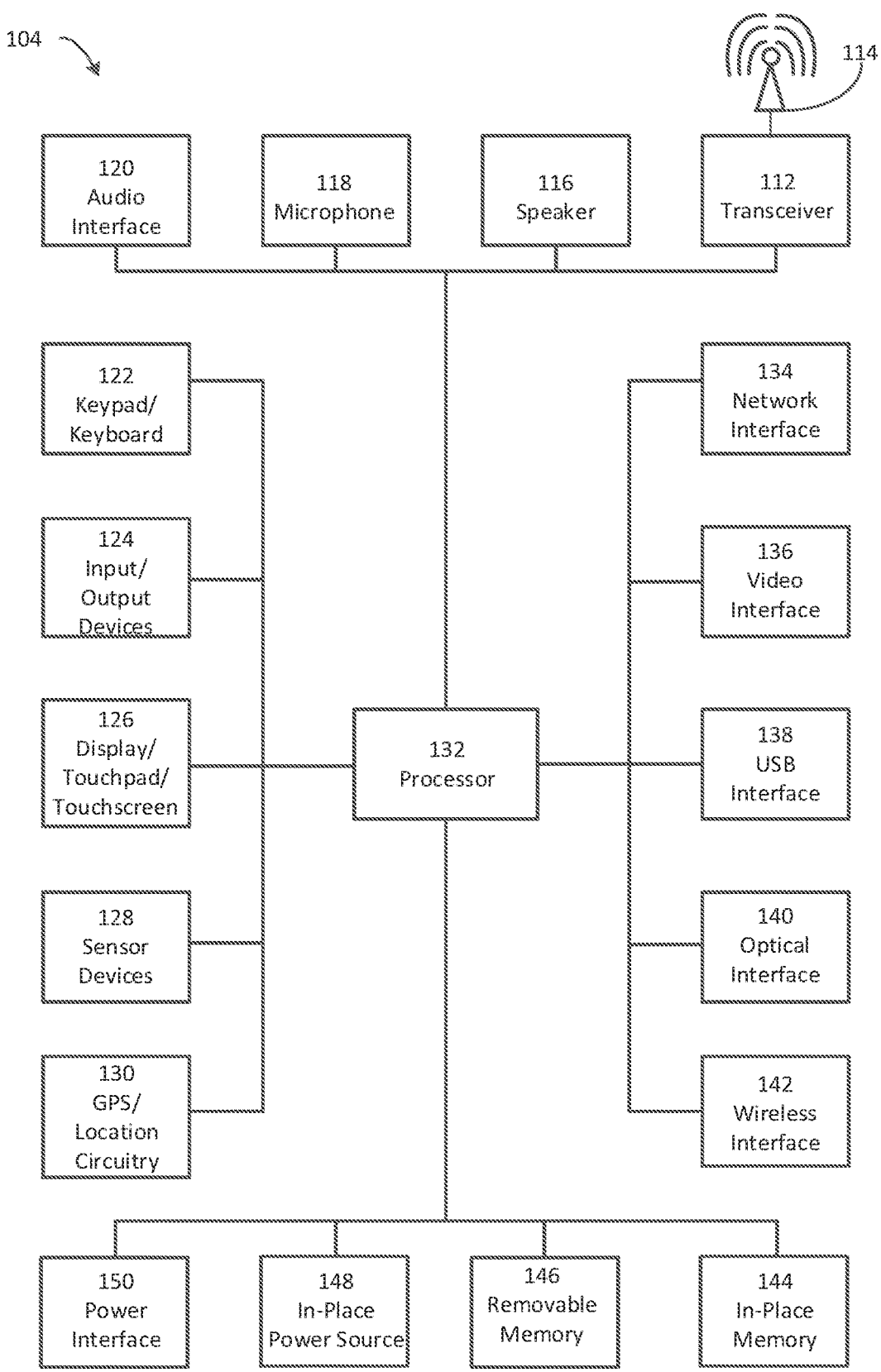
FIG. 1 is an example diagram of a computer/processing device wherein one or more of the techniques of the present disclosure may be implemented.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 is a diagram of an example computer/computing (e.g., processing) device 104 that may implement one or more techniques described herein, in whole or at least in part, with respect to one or more of the devices, methods, and/or systems described herein. In FIG. 1, the computing device 104 may include one or more of: a processor 132, a transceiver 112, a transmit/receive element (e.g., antenna) 114, a speaker 116, a microphone 118, an audio interface (e.g., earphone interface and/or audio cable receptacle) 120, a keypad/keyboard 122, one or more input/output devices 124, a display/touchpad/touch screen 126, one or more sensor devices 128, Global Positioning System (GPS)/location circuitry 130, a network interface 134, a video interface 136, a Universal Serial Bus (USB) Interface 138, an optical interface 140, a wireless interface 142, in-place (e.g., non-removable) memory 144, removable memory 146, an in-place (e.g., removable or non-removable) power source 148, and/or a power interface 150 (e.g., power/data cable receptacle). The computing device 104 may include one or more, or any sub-combination, of the aforementioned elements.

The computing device 104 may take the form of a laptop computer, a desktop computer, a computer mainframe, a server, a terminal, a tablet, a smartphone, and/or a cloud-based computing device (e.g., at least partially), and/or the like.

The processor 132 may be a general-purpose processor, a special-purpose processor, a conventional processor, a digital-signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type of integrated circuit (IC), and/or a finite-state machine, and/or the like. The processor 132 may perform signal coding, data processing, power control, sensor control, interface control, video control, audio control, input/output processing, and/or any other functionality that enables the computing device 104 to serve as and/or perform as (e.g., at least partially) one or more of the devices, methods, and/or systems disclosed herein.

The processor 132 may be connected to the transceiver 112, which may be connected to the transmit/receive element 124. The processor 132 and the transceiver 112 may operate as connected separate components (as shown). The processer 132 and the transceiver 112 may be integrated together in an electronic package or chip (not shown).

The transmit/receive element 114 may be configured to transmit signals to, and/or receive signals from, one or more wireless transmit/receive sources (not shown). For example, the transmit/receive element 114 may be an antenna configured to transmit and/or receive RF signals. The transmit/receive element 114 may be an emitter/detector configured to transmit and/or receive IR, UV, or visible light signals, for example. The transmit/receive element 114 may be configured to transmit and/or receive RF and/or light signals. The transmit/receive element 114 may be configured to transmit and/or receive any combination of wireless signals.

Although the transmit/receive element 114 is shown as a single element, the computing device 104 may include any number of transmit/receive elements 114 (e.g., the same as for any of the elements 112-150). The computing device 104 may employ Multiple-Input and Multiple-Output (MIMO) technology. For example, the computing device 104 may include two or more transmit/receive elements 114 for transmitting and/or receiving wireless signals.

The transceiver 112 may be configured to modulate the signals that are to be transmitted by the transmit/receive element 114 and/or to demodulate the signals that are received by the transmit/receive element 114. The transceiver 112 may include multiple transceivers for enabling the computing device 104 to communicate via one or more, or multiple, radio access technologies, such as Universal Terrestrial Radio Access (UTRA), Evolved UTRA (E-UTRA), and/or IEEE 802.11, for example.

The processor 132 may be connected to, may receive user input data from, and/or may send (e.g., as output) user data to: the speaker 116, microphone 118, the keypad/keyboard 122, and/or the display/touchpad/touchscreen 126 (e.g., a liquid crystal display (LCD) display unit or organic light-emitting diode (OLED) display unit, among others). The processor 132 may retrieve information/data from and/or store information/data in, any type of suitable memory, such as the in-place memory 144 and/or the removable memory 146. The in-place memory 144 may include random-access memory (RAM), read-only memory (ROM), a register, cache memory, semiconductor memory devices, and/or a hard disk, and/or any other type of memory storage device.

The removable memory 146 may include a subscriber identity module (SIM) card, a portable hard drive, a memory stick, and/or a secure digital (SD) memory card, and/or the like. The processor 132 may retrieve information/data from, and/or store information/data in, memory that might not be physically located on the computing device 104, such as on a server, the cloud, and/or a home computer (not shown).

One or more of the elements 112-146 may receive power from the in-place power source 148. In-place power source 148 may be configured to distribute and/or control the power to one or more of the elements 112-146 of the computing device 104. The in-place power source 148 may be any suitable device for powering the computing device 104. For example, the in-place power source 148 may include one or more dry cell batteries (e.g., nickel-cadmium (NiCd), nickel-zinc (NiZn), nickel metal hydride (NiMH), lithium-ion (Li-ion), etc.), solar cells, and/or fuel cells, and/or the like.

Power interface 150 may include a receptacle and/or a power adapter (e.g., transformer, regulator, and/or rectifier) that may receive externally sourced power via one or more AC and/or DC power cables, and/or via wireless power transmission. Any power received via power interface 150 may energize one or more of the elements 112-146 of computing device 104, perhaps for example exclusively or in parallel with in-place power source 148. Any power received via power interface 150 may be used to charge in-place power source 148.

The processor 132 may be connected to the GPS/location circuitry 130, which may be configured to provide location information (e.g., longitude and/or latitude) regarding the current location of the computing device 104. The computing device 104 may acquire location information by way of any suitable location-determination technique.

The processor 132 may be connected to the one or more input/output devices 124, which may include one or more software and/or hardware modules that provide additional features, functionality and/or wired and/or wireless connectivity. For example, the one or more input/output devices 124 may include a digital camera (e.g., for photographs and/or video), a hands free headset, a digital music player, a media player, a frequency modulated (FM) radio unit, an Internet browser, and/or a video game player module, and/or the like.

The processor 132 may be connected to the one or more sensor devices 128, which may include one or more software and/or hardware modules that provide additional features, functionality and/or wired and/or wireless connectivity. For example, the one or more sensor devices 128 may include an accelerometer, an e-compass, and/or a vibration device, and/or the like.

The processor 132 may be connected to the network interface 134, which may include one or more software and/or hardware modules that provide additional features, functionality and/or wireless and/or wired connectivity. For example, the network interface 134 may include a Network Interface Controller (NIC) module, a Local Area Network (LAN) module, an Ethernet module, a Physical Network Interface (PNI) module, and/or an IEEE 802 module, and/or the like.

The processor 132 may be connected to the video interface 136, which may include one or more software and/or hardware modules that provide additional features, functionality and/or wired and/or wireless connectivity. For example, the video interface 136 may include a High-Definition Multimedia Interface (HDMI) module, a Digital Visual Interface (DVI) module, a Super Video Graphics Array (SVGA) module, and/or a Video Graphics Array (VGA) module, and/or the like.

The processor 132 may be connected to the USB interface 138, which may include one or more software and/or hardware modules that provide additional features, functionality and/or wired and/or wireless connectivity. For example, the USB interface 138 may include a universal serial bus (USB) port, and/or the like.

The processor 132 may be connected to the optical interface 140, which may include one or more software and/or hardware modules that provide additional features, functionality and/or wired and/or wireless connectivity. For example, the optical interface 140 may include a read/write Compact Disc module, a read/write Digital Versatile Disc (DVD) module, and/or a read/write Blu-ray™ disc module, and/or the like.

The processor 132 may be connected to the wireless interface 142, which may include one or more software and/or hardware modules that provide additional features, functionality and/or wireless connectivity. For example, the wireless interface 142 may include a Bluetooth® module, an Ultra-Wideband (UWB) module, a ZigBee module, and/or a Wi-Fi (IEEE 802.11) module, and/or the like.

One or more techniques described herein may be applied to a professional, college, and/or other level court-based basketball game. One or more of the disclosed techniques may be applied to other sports/spectacles such as but not limited to: a professional, college, and/or other level football field/arena; a professional, college, and/or other level baseball field/area; a professional, college, and/or other level ice-hockey rink/arena; a tennis court/arena; a lacrosse field/arena; a volleyball sand-based court and/or hard-surface court/arena; a professional, college, and/or other level soccer field/arena; a rugby field/arena; a bowling alley/arenas; a competitive swimming pool/arena; a snow-skiing venue; and/or a track & field course/area; among other sport fields/tracks/pools/courses/venues/arenas.

One or more techniques described herein may use venue/arena based audio/video equipment, one or more application programming interfaces (API), and/or one or more applications (e.g., web-based applications) to provide the sporting event experience.

Amazon, Google, and/or Sonos, among others, may be useful partners with which to practice one or more techniques described herein. In one or more techniques, a partner device and/or a consumer's mobile device, perhaps for example upon a consumer command, may take a sample of in-home TV audio and/or video, for example perhaps based on a requested service of the sporting event content application. The sample may be compared to one or more content libraries (e.g., Internet/Cloud based) via one or more APIs, for example.

In one or more techniques, perhaps for example once at least one sample is identified, the consumer's device may stream the requested content corresponding to a sporting event broadcast (e.g., via television, radio, cable, satellite the consumer may be viewing. The streamed requested content may be in substantial time alignment (e.g., relatively perfect time alignment, perhaps based on average human perception) with the sporting event broadcast that the consumer is receiving (e.g., perhaps regardless of delay, replay, and/or DVR activity).

In one or more techniques, one or more augmented services/content can be requested via a partner device and/or the consumer's mobile device, perhaps enhancing advertisements made during the sports event broadcast and/or original broadcast, such as direct product fulfillment and/or requests for additional information for advertised goods and/or services.

One or more techniques disclosed herein enabled enhanced application audio and/or video distribution to one or more recipients. One or more techniques described herein might not change existing broadcast processes or technology. One or more techniques may enhance the "in-home" experience with audio and/or video sights and sounds that enhance and/or compliment a conventional broadcast of the sporting event. One or more techniques may be activated by at least one consumer request for pairing sporting event content with a broadcast sporting event.

In one or more techniques, for example for an enhanced audio experience, a synchronization routine may be conducted with the consumer's smart speaker and/or a consumer's mobile device. The consumer's smart speaker and/or mobile device may play sound taking place on, near, and/or around the court in substantial time alignment with a television broadcast of the sporting event, for example. The substantial time alignment may be arranged regardless of whether the broadcast of the sporting event was made in real time, somewhat delayed in time, or from a past recording of the sporting event.

For example, the sporting event content may provide sounds including arena noises, player voices and/or dialog, officials' voices and/or dialog, and/or coaching staff voices and/or dialog.

For example, the sporting event content may provide an enhanced video experience (and/or an enhanced audio experience), the consumer's mobile device and/or smart speaker with video capability may act as a 360-degree window to the sporting event (and/or some level of video coverage from various angles), perhaps providing sights from the arena, players, crowd, officials, and/or coaches, and/or graphically generated content and/or virtual reality (VR) content. The consumer's smart speaker with video capability and/or mobile device may provide the enhanced video content in substantial time alignment with a television broadcast of the sporting event, for example. The substantial time alignment may be arranged regardless of whether the broadcast of the sporting event was made in real time, somewhat delayed in time, or from a past recording of the sporting event.

Figure 2:
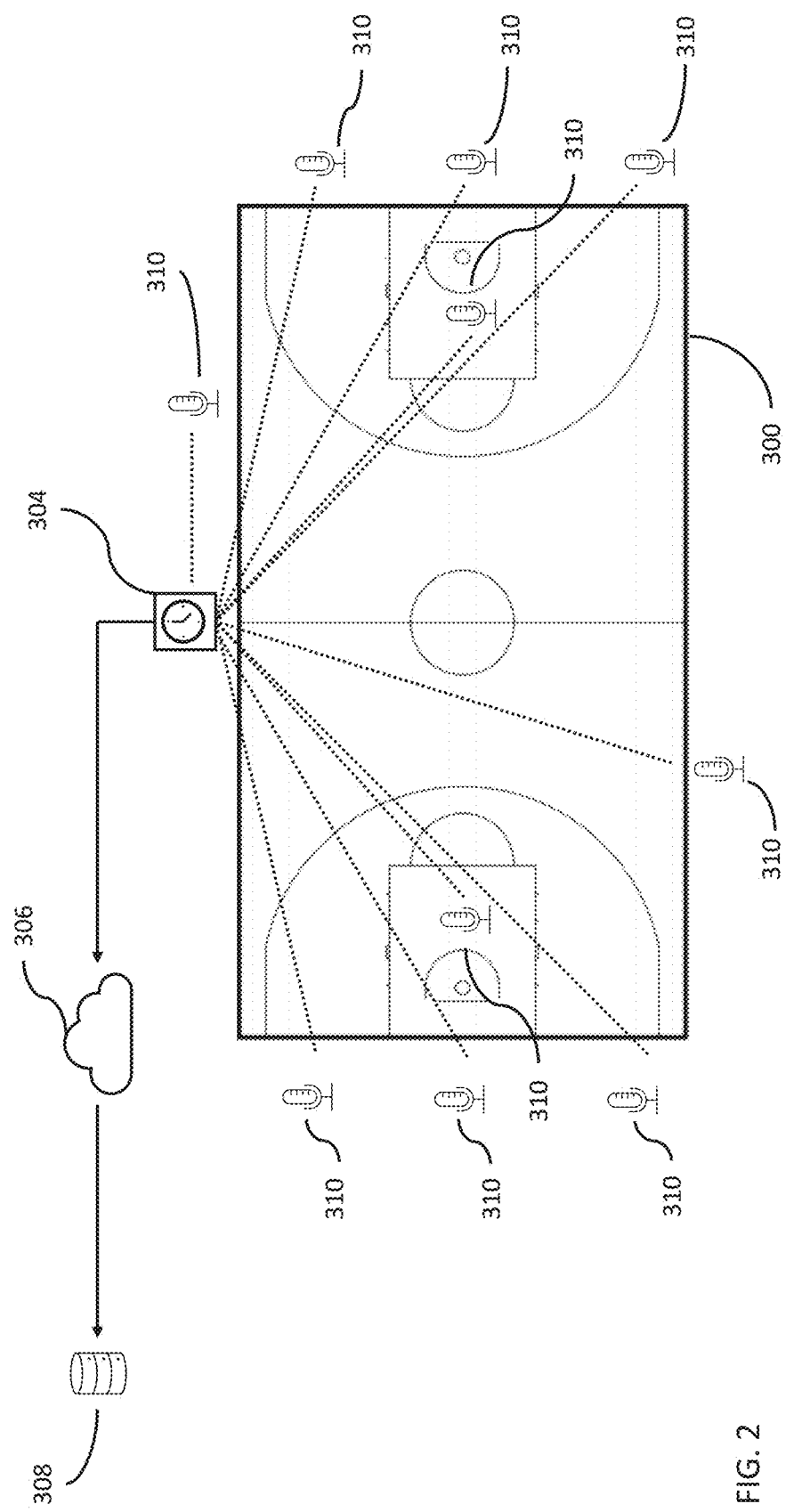
FIG. 2 illustrates an example of application audio processing techniques according to the present disclosure.

FIG. 2 illustrates an example of application audio processing techniques. One or more techniques may leverage one or more audio assets that may be available in venues/arenas hosting sporting events. In one or more techniques, microphones may be placed around the field-of-play that may send captured audio to a control unit. One or more recordings may be time encoded and/or exported to one or more storage locations (e.g., a cloud-based storage facility).

Shown in FIG. 2 are a plurality of audio capture devices 310, such as, for example, microphones, installed in various locations near sport venue 300. In one or more techniques, audio capture devices 310 may send captured audio to a processing unit 304. In at least one technique, processing unit 304 comprises one or more computing devices 104 configured by way of hardware, firmware, software, and/or circuitry, and/or a combination thereof to perform the functions described herein. Any such firmware and/or software may be embodied in or on computer readable media. One or more such recordings may be time encoded by processing unit 304 and/or exported by processing unit 304 to one or more storage locations 308 (e.g., a cloud-based storage facility). In at least one technique, a storage location 308 comprises one or more computing devices 104 configured by way of hardware, firmware, software, and/or circuitry and/or a combination thereof to perform the functions described herein. Any such firmware and/or software may be embodied in or on computer readable media. In at least one technique, one or more such recordings may be exported by processing unit 304 to one or more storage locations 308 via network 306.

Network 306 may be implemented as any type of wired and/or wireless network, including a local area network (LAN), a wide area network (WAN), a global network (the Internet), etc. Accordingly, network 306 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, compute devices, storage devices, etc.

Some level of content editing (e.g., muting/bleeping foul/obscene language, obscuring impolite gestures, etc.) may be performed on the recorded content in the storage/library location 308, perhaps prior to any delivery of the content to consumers. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like.

In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

Figure 3:
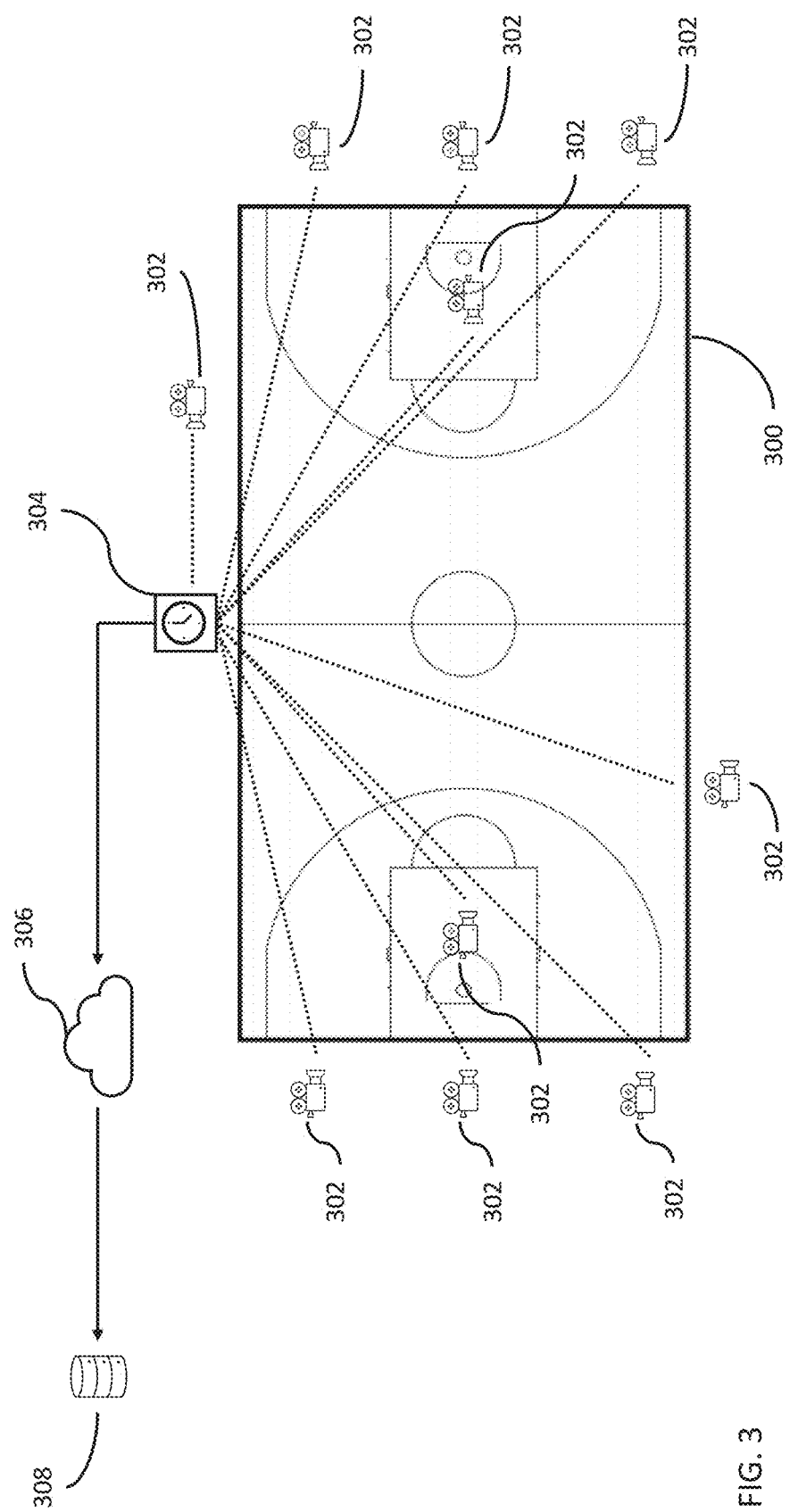
FIG. 3 illustrates an example of application video processing techniques according to the present disclosure.

FIG. 3 illustrates an example of application video processing techniques. One or more techniques may leverage one or more video assets that may be available in venues/arenas hosting sporting events. In one or more techniques, perhaps 360 degrees of coverage, or at least some amount of coverage, of cameras may be placed around a field-of-play to capture one or more video streams. The captured video streams may be sent to a processing unit. One or more streams may be time encoded and/or exported to one or more storage locations (e.g., a cloud-based storage facility).

Shown in FIG. 3 are a plurality of video capture devices 302, such as, for example, cameras, installed in various locations near sport venue 300. In one or more techniques, video capture devices 302 may send captured video to a processing unit 304. One or more such recordings may be time encoded by processing unit 304 and/or exported by processing unit 304 to one or more storage locations 308 (e.g., a cloud-based storage facility). In at least one technique, one or more such recordings may be exported by processing unit 304 to one or more storage locations 308 via network 306.

In one or more techniques, one or more algorithms (e.g., Artificial Intelligence (AI) algorithms, among other kinds of algorithms) may be used to screen for offensive content, perhaps for example in real-time or near real time, among other times. Stored and/or processed video content may be available for access via a secure API, or the like. In one or more techniques, processed video content may be combined with processed audio content for delivery to a requesting consumer.

Figure 4A:
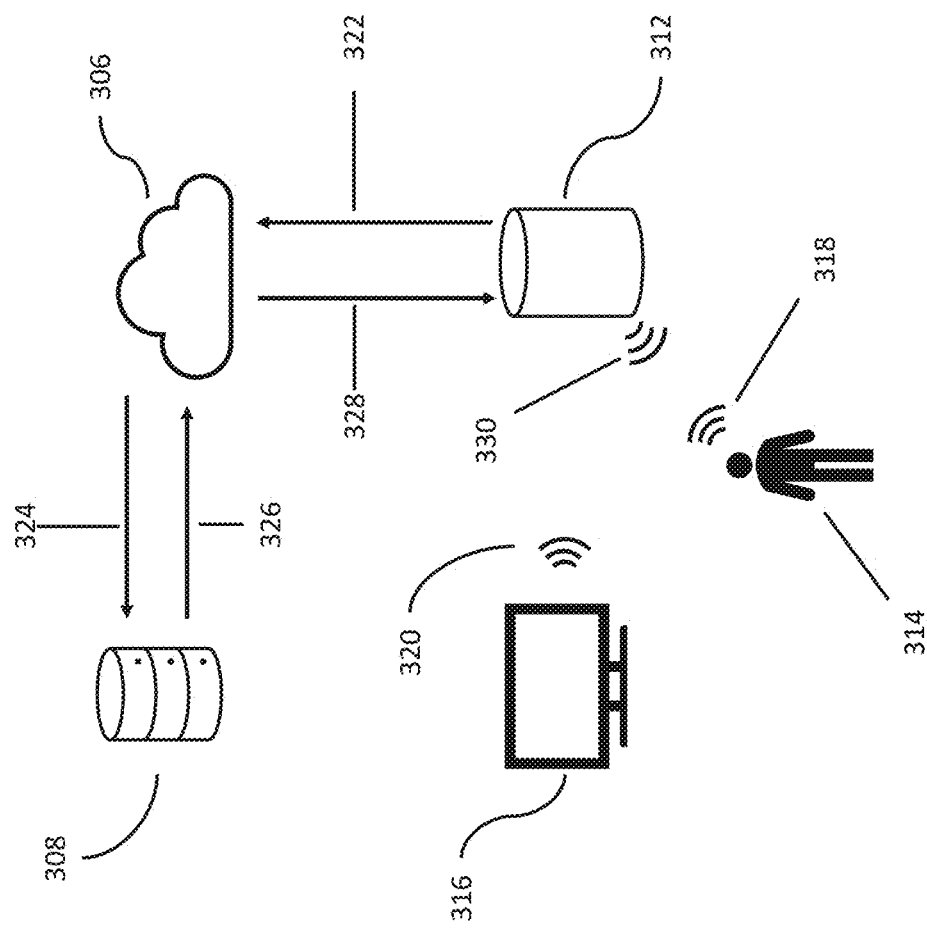
FIG. 4A illustrates an example of enhanced audio and/or video delivery techniques according to the present disclosure.
Figure 4B:
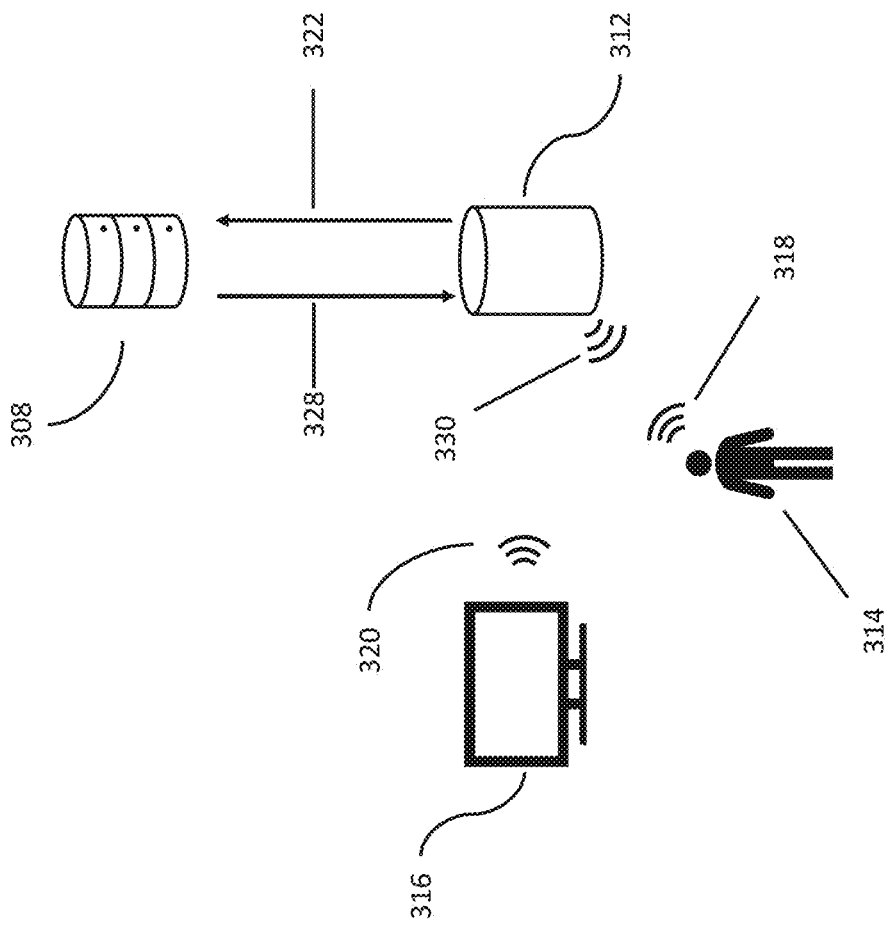
FIG. 4B illustrates an example of enhanced audio and/or video delivery techniques according to the present disclosure.
Figure 5:
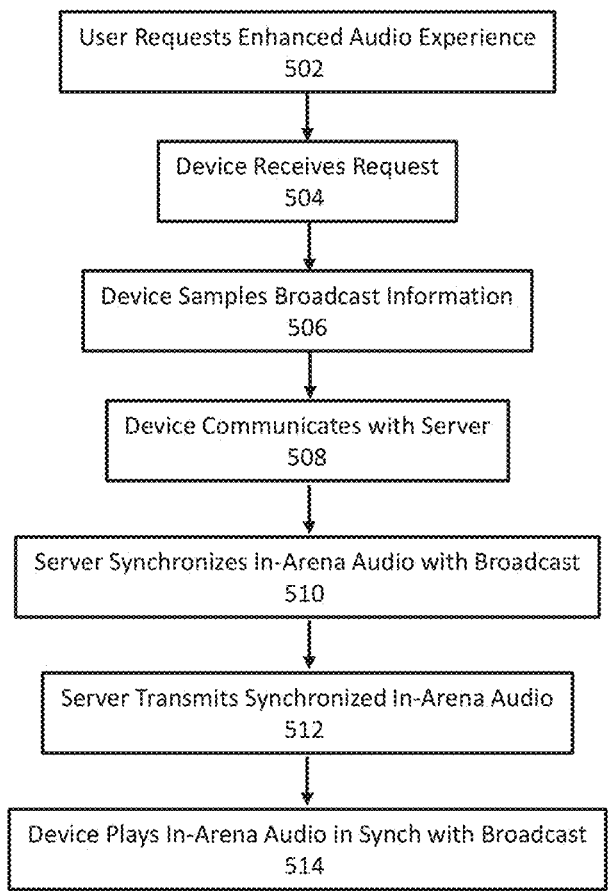
FIG. 5 is a flowchart showing a method of communicating an event experience according to the present disclosure.

FIGS. 4A-B and FIG. 5 illustrate examples of enhanced content delivery techniques. Shown in FIGS. 4A-B are network 306, storage locations 308, content access device 312, media delivery device 316, and consumer 314. In at least one technique, content access device 312 comprises one or more computing devices 104 configured by way of hardware, firmware, software, and/or circuitry, and/or a combination thereof to perform the functions described herein. Any such firmware and/or software may be embodied in or on computer readable media. In at least one technique, content access device 312 comprises a smart phone, such as, for example, a smart phone sold by Apple™, Google™, Samsung™, and/or other vendors. In at least one technique, content access device 312 comprises a smart speaker, such as, for example, a smart speaker sold by Amazon™, Google™, Sonos™, and/or other vendors. In at least one technique, media delivery device 316 comprises one or more computing devices 104 configured by way hardware, firmware, software, and/or circuitry, and/or a combination thereof to perform the functions described herein. Any such firmware and/or software may be embodied in or on computer readable media. In at least one technique, media delivery device 316 comprises a television, such as, for example, a television sold by Samsung™, LG™, Sony™ and/or other vendors.

At block 502 of FIG. 5, consumer 314 requests that content access device 312 deliver enhanced content 330, such as, for example, by way of voice command 318 given to content access device 312. Alternatively, consumer 314 may issue a command to content access device 312 by way of any interface technique that is compatible with content access device 312.

At block 504 of FIG. 5, content access device 312 processes the request for delivery of enhanced content 330.

At block 506 of FIG. 5, content access device 312 obtains a sample of broadcast information 320 from media delivery device 316. For example, in at least one technique, content access device 312 may be equipped with a microphone that is capable of receiving broadcast information 320 in audio form. Alternatively, content access device 312 may obtain a sample of broadcast information 320 from media delivery device 316 by way of any technique that is compatible with content access device 312 and media delivery device 316. In at least one technique, content access device 312 may time encode broadcast information 320 (e.g., with a universal clock service, GPS, or the like).

At block 508 of FIG. 5, content access device 312 communicates the request for enhanced content and broadcast information 320 to storage location 308. As shown in FIG. 4A, signals 322/324, comprising the request for enhanced content and broadcast information 320, are transmitted to storage location 308 via network 306. As shown in FIG. 4B, signal 322, comprising the request for enhanced content and broadcast information 320, is transmitted to storage location 308. In this configuration, there is no use of a network 306.

At block 510 of FIG. 5, storage location 308 processes the request of delivery of enhanced content 330 and broadcast information 320. Storage location 308 compares broadcast information 320 to time encoded recordings stored on storage location 308 so as to synchronize the time encoded recordings stored on storage location 308 with the media then being delivered through media delivery device 316.

Figure 6:
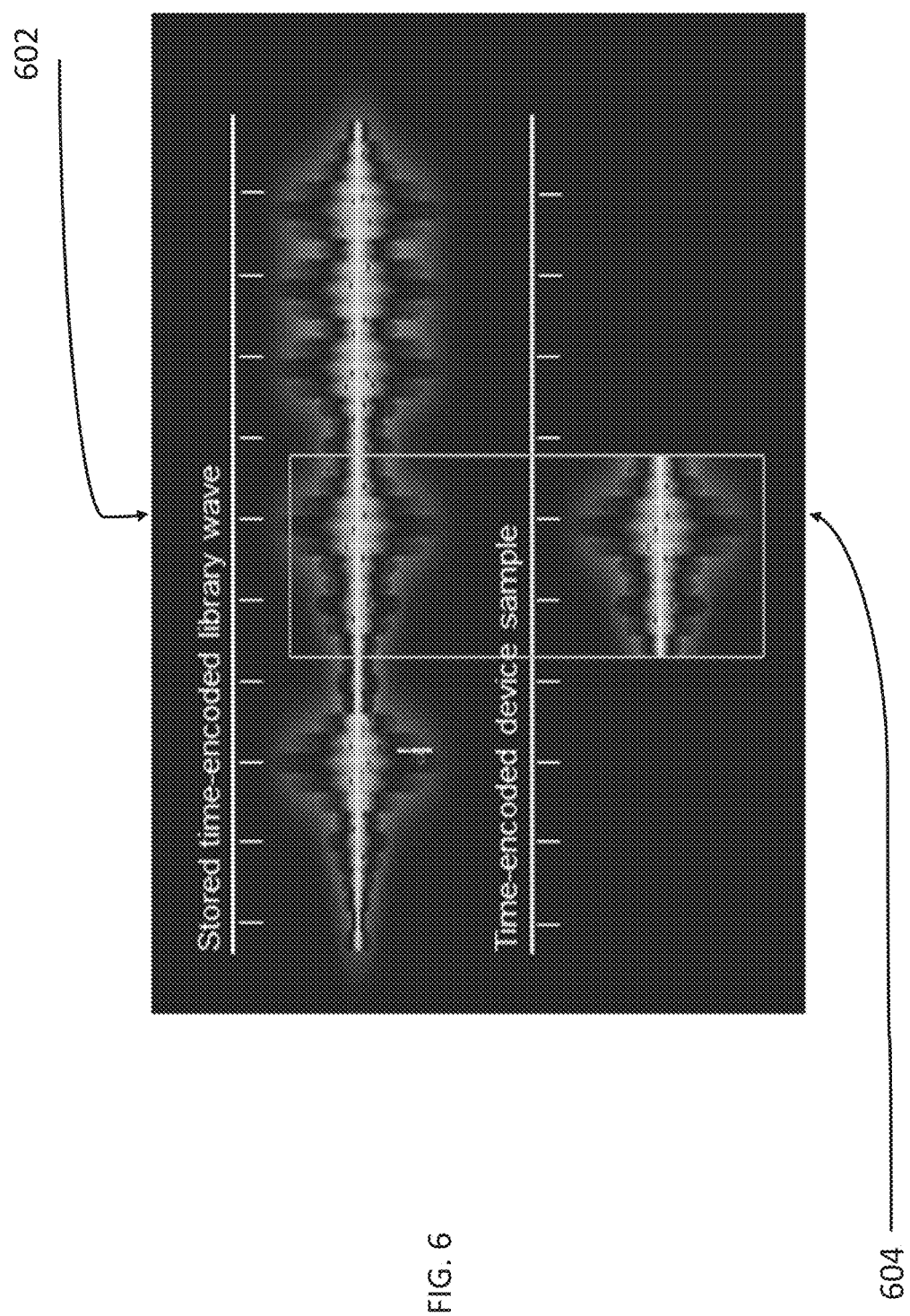
FIG. 6 illustrates an example of an application coding/encoding and comparison techniques according to the present disclosure.

FIG. 6 illustrates an example of an application coding/encoding and comparison techniques. FIG. 6 illustrates a sample "lookup" process that may be used to identify the requested sporting event content by one or more techniques. As shown on FIG. 6, a time encoded recording 602 is retrieved by storage location 308 and compared to sample 604. Sample 604 may comprise all of, or any portion of, broadcast information 320, or may be algorithmically derived from all of, or any portion of, broadcast information 320. In one or more techniques, the lookup process may also determine the most suitable timing alignment for the sporting event content, perhaps for example, based on a timing comparison between a consumer provided timing sample and a timing in the encoded sporting event content in a storage location/library.

In one or more techniques, the use of universal clock may be useful, perhaps for example to ensure a best possible alignment of a sample code with encoded content in one or more storage locations. In one or more techniques, the sampling/comparison process may continue to run in background, perhaps for example to ensure devices may stay time aligned throughout broadcasted event, among other reasons.

Returning to block 510 of FIG. 5, storage location 308 may employ further processing techniques upon the request of delivery of enhanced content 330 and broadcast information 320. For example, storage location 308 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

At block 510 of FIG. 5, storage location 308 may employ other processing techniques upon the request of delivery of enhanced content 330 and broadcast information 320. For example, in one or more techniques, one or more augmented services/content can be added to enhanced content 330, perhaps enhancing advertisements made during the sports event broadcast and/or original broadcast, with the capability for direct product fulfillment and/or requests for additional information for advertised goods and/or services requested via content access device 312 and/or another device At block 512 of FIG. 5, storage location 308 communicates enhanced content 330 to content access device 312. As shown in FIG. 4A, signals 326/328, comprising enhanced content 330, are transmitted to content access device 312 via network 306. As shown in FIG. 4B, signal 326, comprising enhanced content 330, is transmitted to content access device 312. In this configuration, there is no use of a network 306.

At block 514 of FIG. 5, enhanced content 330 is delivered by content access device 312, such as by audio and or video emitted by content access device 312. Enhanced content 330 will be at least substantially in synchronization with the media then being delivered through media delivery device 316. Content access device 312 may employ further processing techniques on enhanced content 330 prior to delivery. For example, content access device 312 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

Figure 7:
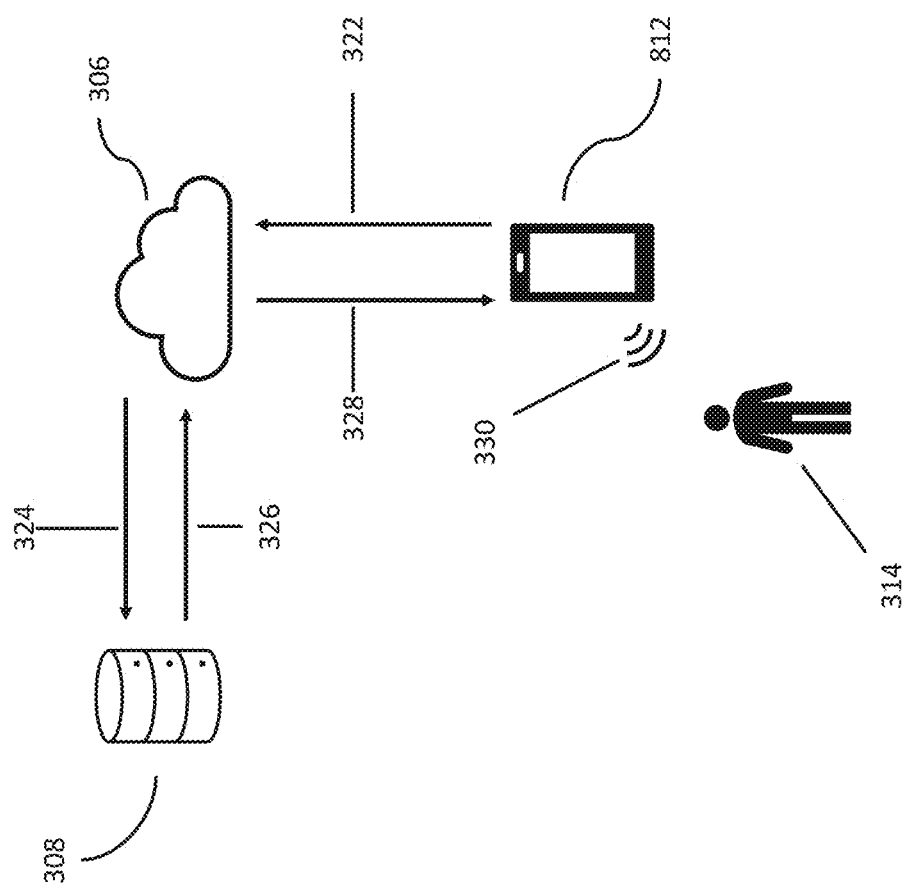
FIG. 7 illustrates an example of enhanced audio and/or video delivery techniques according to the present disclosure.
Figure 8:
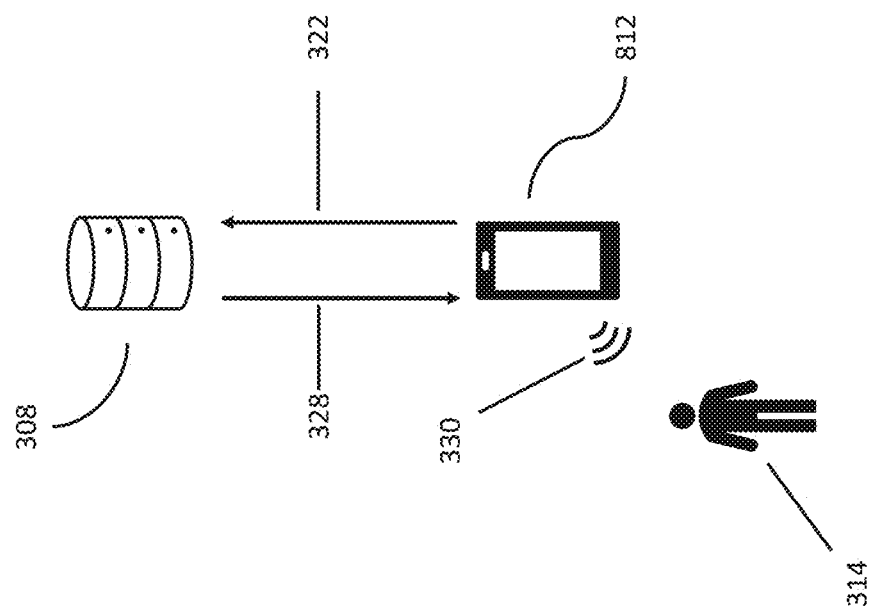
FIG. 8 illustrates an example of enhanced audio and/or video delivery techniques according to the present disclosure.

FIGS. 7-11 illustrate examples of enhanced content delivery techniques, where a consumer is present at a live event but desires enhanced content regarding the live event. Shown in FIGS. 7-8 are network 306, storage locations 308, consumer 314, and content access device 812. In at least one technique, content access device 812 comprises one or more computing devices 104 configured by way of hardware, firmware, software, and/or circuitry, and/or a combination thereof to perform the functions described herein. Any such firmware and/or software may be embodied in or on computer readable media. In at least one technique, content access device 812 comprises a smart phone, such as, for example, a smart phone sold by Apple™, Google™, Samsung™, and/or other vendors. In at least one technique, content access device 812 comprises a smart speaker, such as, for example, a smart speaker sold by Amazon™ Google™, Sonos™, and/or other vendors.

Figure 9:
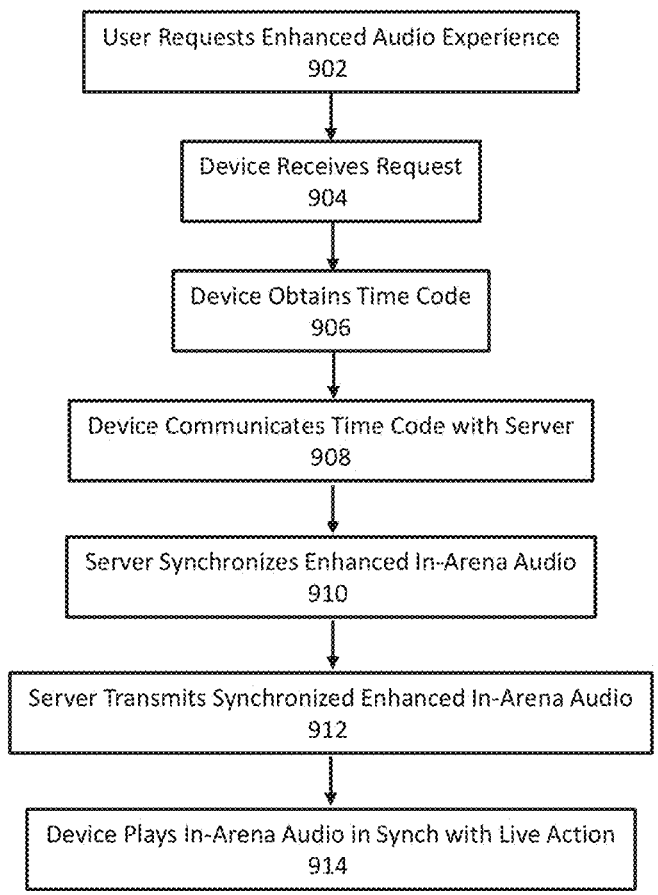
FIG. 9 is a flowchart showing a method of communicating an event experience according to the present disclosure.

At block 902 of FIG. 9, consumer 314 requests that content access device 812 deliver enhanced content 330, such as, for example, by way of a voice command given to content access device 812. Alternatively, consumer 314 may issue a command to content access device 812 by way of any interface technique that is compatible with content access device 812.

At block 904 of FIG. 9, content access device 812 processes the request for delivery of enhanced content 330.

At block 906 of FIG. 9, content access device 812 determines a time code corresponding to the request for enhanced content 330. In at least one technique, content access device 812 may time encode the request based on the internal clock on content access device 812, or by way of a universal clock service, GPS, or the like.

At block 908 of FIG. 9, content access device 812 communicates the request for enhanced content and broadcast information 320 to storage location 308. As shown in FIG. 7, signals 322/324, comprising the request for enhanced content and broadcast information 320, are transmitted to storage location 308 via network 306. As shown in FIG. 8, signal 322, comprising the request for enhanced content and broadcast information 320, is transmitted to storage location 308. In this configuration, there is no use of a network 306. For example, storage location 308 may be available within the vicinity of content access device 812.

At block 910 of FIG. 9, storage location 308 processes the request of delivery of enhanced content 330. Storage location 308 compares broadcast information 320 to the time encoding of the request communicated by content access device 812 so as to synchronize the time encoded recordings stored on storage location 308 with the live event then being observed by consumer 314.

In one or more techniques, the use of universal clock may be useful, perhaps for example to ensure a best possible alignment of a sample time code with encoded content in one or more storage locations. In one or more techniques, the sampling/comparison process may continue to run in background, perhaps for example to ensure devices may stay time aligned, among other reasons.

Returning to block 910 of FIG. 9, storage location 308 may employ further processing techniques upon the request of delivery of enhanced content 330. For example, storage location 308 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

At block 910 of FIG. 9, storage location 308 may employ other processing techniques upon the request of delivery of enhanced content 330. For example, in one or more techniques, one or more augmented services/content can be added to enhanced content 330, perhaps enhancing advertisements made during the sports event broadcast and/or original broadcast, with the capability for direct product fulfillment and/or requests for additional information for advertised goods and/or services requested via content access device 812 and/or another device At block 912 of FIG. 9, storage location 308 communicates enhanced content 330 to content access device 812. As shown in FIG. 7, signals 326/328, comprising enhanced content 330, are transmitted to content access device 812 via network 306. As shown in FIG. 8, signal 326, comprising enhanced content 330, is transmitted to content access device 812. In this configuration, there is no use of a network 306. For example, storage location 308 may be available within the vicinity of content access device 812.

At block 914 of FIG. 9, enhanced content 330 is delivered by content access device 812, such as by audio and or video emitted by content access device 812. Enhanced content 330 will be at least substantially in synchronization with the live event then being observed by consumer 314. Content access device 812 may employ further processing techniques on enhanced content 330 prior to delivery. For example, content access device 812 may edit enhanced content 330 to, for example, mute/bleep foul/obscene language, obscure impolite gestures, etc. prior to any delivery of the enhanced content 330. In one or more techniques, one or more algorithms (e.g., Artificial Intelligence (AI) algorithms, among other kinds of algorithms) may be used to screen for offensive content, perhaps for example in real-time or near real time, among other times. Stored and/or processed/edited content may be available for access via a secure API, or the like. In one or more techniques, different variations of the sporting event content may be created and/or requested by the consumer. For example, perhaps an adult consumer may wish to receive unedited sporting event content, among other scenarios. Also, for example, a consumer watching a sporting event broadcast may wish to receive sporting event content that has been edited to remove questionable or undesirable audio and/or video content.

Figure 10:
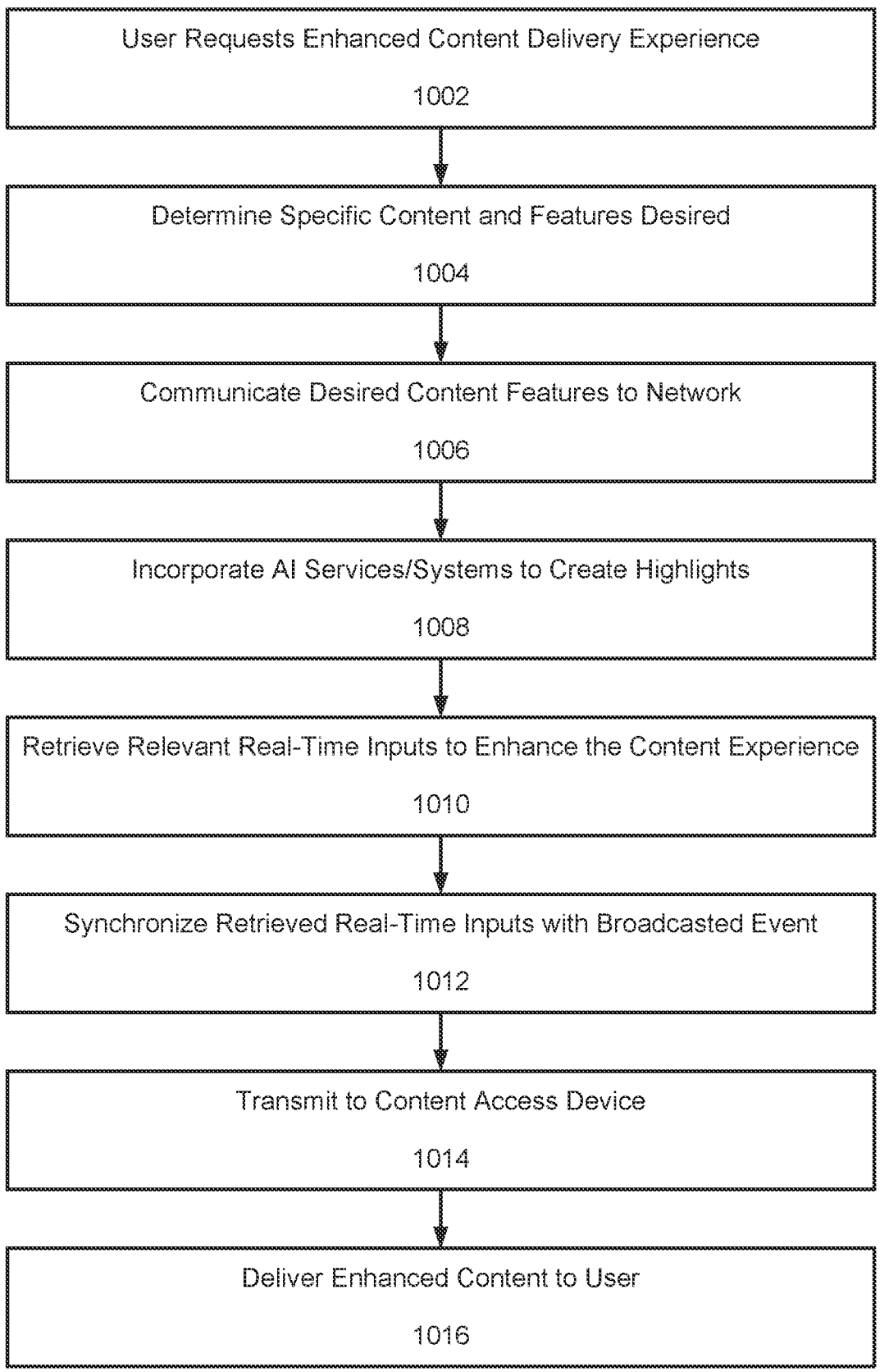
FIG. 10 is a flowchart showing a method of communicating an event experience according to the present disclosure.

FIG. 10 depicts an enhanced content delivery process flow with additional real-time inputs. As shown in FIG. 10, at block 1002 the consumer can initiate the request for enhanced content delivery using various content access devices, such as content access device 812 (e.g., a smartphone) or content access device 812 (e.g., a smart speaker). The consumer can issue voice commands, select options from a user interface, or interact with applications to trigger the request. For example, in some embodiments the consumer can issue the voice command, "provide me with real-time audio highlights of the basketball game." In some embodiments, the consumer can use a mobile app to select "Augmented Reality mode" for an immersive experience.

At block 1004 of FIG. 10, the content access device 812 can process the request and determine the specific content and features desired by the consumer. The consumer can request various real-time inputs from AI services and systems to enhance their sporting event experience. For instance, the consumer can request real-time audio highlights, video replays, live statistics, player insights, social media updates, virtual reality overlays, or personalized commentary. The content access device can utilize AI algorithms to analyze the consumer's preferences and deliver tailored content.

At block 1006 of FIG. 10, the content access device 812 can communicate the request and desired content features to the network, represented by network 306. The network can be a wired or wireless network, including the internet, enabling seamless data transmission between the content access device and the storage locations, such as storage location 308. The content access device can send the request via Wi-Fi, cellular networks, or any other suitable network connection.

At block 1008 of FIG. 10, the storage location 308 can serve as an integral part of the enhanced content delivery process by incorporating AI services and systems designed to create audio, video, or statistical highlights. These AI-driven sources, whether located at the event or produced independently, play a significant role in enhancing the overall experience for the consumer.

Regarding audio highlights, AI-powered audio generation systems can analyze real-time data from the sporting event, such as player movements, crowd reactions, and referee calls. This analysis enables the generation of realistic crowd sounds, including cheers, applause, and chants, to create an immersive audio experience. Additionally, AI voice synthesis technologies can simulate the voices of renowned sports commentators or celebrity analysts, providing dynamic and insightful commentary throughout the event.

For video highlights, AI systems utilize computer vision algorithms to automatically identify key moments in the sporting event. These systems can identify noteworthy plays, goals, or game-changing actions in real-time, allowing for the creation of captivating video clips. Visual effects, slow-motion replays, and dynamic transitions can be added to enhance the generated video highlights, providing viewers with a comprehensive summary of the event.

AI-powered analytics platforms are instrumental in providing real-time data analysis and generating informative statistics. These platforms process extensive data, including player performance metrics, team statistics, and historical trends, to extract meaningful insights. The statistical highlights can be presented in visually appealing formats such as charts, graphs, or interactive visualizations, providing viewers with a deeper understanding of the game and player performance. The integration of predictive modeling enhances the statistical analysis by leveraging AI algorithms to generate predictions on future game outcomes, player performances, or in-game strategies. These predictions add excitement and anticipation for viewers, enabling them to engage in discussions and make informed predictions of their own.

Furthermore, storage location 308 can incorporate AI-driven enhancement techniques such as noise reduction algorithms for audio clarity and image processing algorithms for video quality improvements. These techniques aim to optimize the overall audio and visual experience, minimizing background noise, enhancing image details, and ensuring a more immersive and enjoyable viewing experience. Storage location 308 can integrate AI services and systems that create audio, video, and statistical highlights. Through AI-generated audio commentary, visually engaging video highlights, and insightful statistical analyses, viewers can enjoy a more interactive and captivating sporting event experience.

At block 1010 of FIG. 10, storage location 308 can process the consumer's request and retrieving relevant real-time inputs to enhance the content experience. This process involves accessing a wide range of AI-generated audio, video, and statistical highlights that capture key moments, impressive plays, controversial incidents, and valuable insights from the game.

To begin, storage location 308 can access AI-generated audio clips that encapsulate the essence of the sporting event. These clips can include exciting commentary, exhilarating crowd reactions, or even audio snippets of interviews with players and coaches. For example, if a consumer requests highlights of a basketball game, storage location 308 can retrieve AI-generated audio clips of intense game commentary, iconic play-by-play calls, or even snippets of interviews with star players.

In addition to audio highlights, storage location 308 can obtain video snippets that showcase remarkable plays or controversial incidents. These video clips can capture pivotal moments such as game-winning shots, outstanding displays of athleticism, or contentious referee decisions. By leveraging AI-based video analysis, the system can automatically identify and retrieve the most compelling video segments. For instance, if a consumer desires video highlights from a soccer match, storage location 308 can provide clips of spectacular goals, breathtaking saves, or contentious penalty incidents.

Moreover, storage location 308 can retrieve statistical data and insights related to player performance or team strategies. This information can include player statistics, team rankings, historical data comparisons, or even predictive analytics. By accessing AI-powered sports analytics platforms, the system can offer comprehensive and up-to-date statistical information. For example, if a consumer seeks insights into a tennis match, storage location 308 can provide detailed statistics on a player's serve speed, unforced errors, or success rates on specific shot types.

To ensure comprehensive coverage and a diverse range of content options, the system can consider multiple sources. These sources may include official league data feeds, sports media outlets, social media platforms, fan-generated content, or the like. By aggregating data and content from various sources, storage location 308 can deliver a holistic and inclusive content experience. In some non-limiting examples, if a consumer wants to explore a basketball game's highlights, storage location 308 can retrieve content from official league sources, sports news websites, and fan communities, providing a comprehensive overview of the game from multiple perspectives.

The retrieval of these real-time inputs is not limited to a single event or source. The system can continuously update and expand its database of real-time content, ensuring that consumers have access to the latest and most relevant highlights. For example, if a consumer is interested in a particular player's performance across multiple games, storage location 308 can retrieve a compilation of highlights, statistics, and analysis from various matches, allowing the consumer to gain a comprehensive understanding of the player's abilities and impact.

In some embodiments, storage locations fulfill the consumer's request by processing the desired content features and retrieving real-time inputs. This can include accessing AI-generated audio clips, video snippets, and statistical data from multiple sources. By offering a diverse range of content options, the system ensures a comprehensive and engaging content experience for the consumer, allowing them to delve into the key moments, impressive plays, and valuable insights of the sporting event.

At block 1012 of FIG. 10, storage location 308 can synchronize the retrieved real-time inputs with the monitored broadcasted event, ensuring temporal alignment for a seamless content experience. This synchronization process can include comparing the time encoding of the broadcast information, encompassing audio and video feeds, with the assigned time codes of the real-time inputs.

To achieve temporal alignment, the system utilizes various techniques and technologies. One approach is precise timecode matching, where the time codes of the real-time inputs are precisely matched with the corresponding moments in the monitored broadcasted event. For example, if a specific audio highlight is assigned a time code indicating it occurred at the 15th minute of a soccer match, the system aligns this highlight to the exact moment in the live broadcast where it occurred.

Additionally, machine learning algorithms can be employed to assist in the synchronization process. These algorithms can analyze the audio and video content of both the real-time inputs and the monitored broadcast, identifying key events or patterns to establish synchronization points. By learning from past matches or events, the algorithms can make intelligent predictions and adjustments to align the real-time inputs with the live broadcast. For instance, if an AI system identifies a notable goal celebration in the real-time inputs, it can dynamically adjust the timing to match the corresponding moment in the broadcasted event.

Data interpolation techniques can also be employed to refine the temporal alignment of the real-time inputs. These techniques involve analyzing the timing data of both the real-time inputs and the monitored broadcast and interpolating any discrepancies to achieve a smooth and accurate synchronization. By interpolating missing data points or adjusting timestamps, the system can ensure that the enhanced content remains in sync with the live sporting event. For example, if there is a slight delay in the real-time inputs compared to the monitored broadcast, the system can apply data interpolation to align the content precisely with the corresponding moments.

Storage location 308 can serve as a hub for performing these synchronization operations, and can leverage the processing capabilities and algorithms to compare time codes, match time encoding, and adjust the timing of the real-time inputs accordingly. The precise synchronization ensures that the enhanced content aligns with the live sporting event observed by the consumer, providing an immersive experience.

By employing a combination of precise timecode matching, machine learning algorithms, and data interpolation techniques, the system guarantees that the real-time inputs, such as AI-generated audio clips, video snippets, and statistical highlights, remain in perfect temporal alignment with the monitored broadcasted event. This synchronization process enhances the consumer's viewing experience, allowing them to enjoy the additional content seamlessly integrated with the live sporting event.

At block 1014 of FIG. 10, the synchronized enhanced content, comprising the monitored broadcasted event and the additional real-time inputs, is transmitted from storage location 308 to the content access device via the network. The system can stream the content in real-time or deliver pre-packaged segments for on-demand consumption. The content may include audio clips providing expert analysis on player strategies, video highlights showcasing exceptional goals or slam dunks, or statistical overlays that display live player statistics and comparisons.

Figure 11:
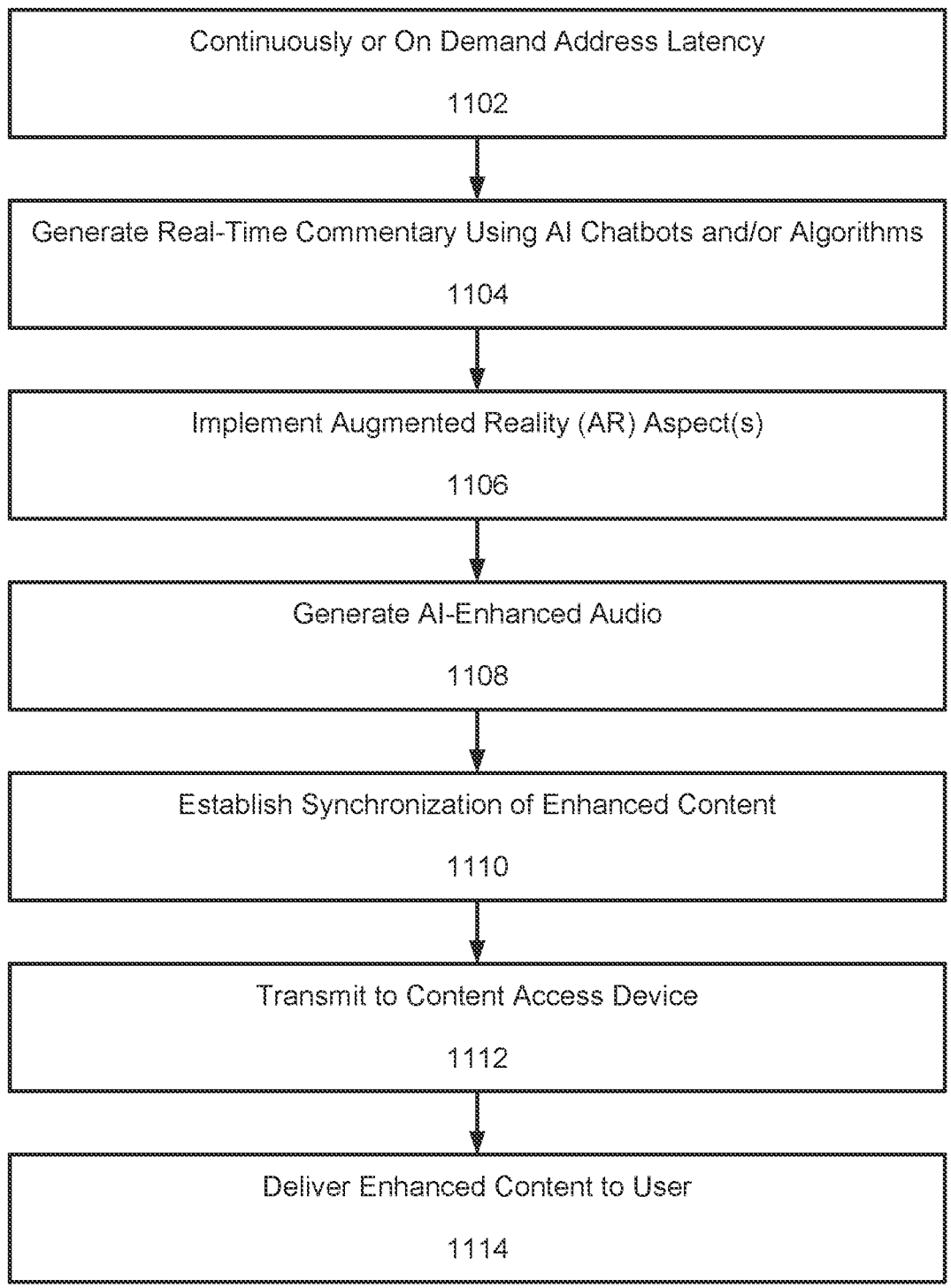
FIG. 11 is a flowchart showing a method of communicating an event experience according to the present disclosure.

At block 1016 of FIG. 10, the content access device receives the enhanced content and prepares it for delivery to the consumer. This can involve further processing to ensure optimal audio and video quality, enhance the user interface for seamless navigation, or integrate augmented reality features into the content. For example, the device can apply audio filters FIG. 11 depicts an enhanced content delivery process flow addressing latency and incorporating AI chatbots and algorithms for unique real-time commentary, augmented reality, and AI-enhancing audio. The following sections provide an in-depth explanation of each block and its functionalities:

At block 1102 of FIG. 11, the system can continuously or on demand address latency in delivering real-time content to the consumer. Latency refers to the delay between the actual occurrence of an event and its transmission to the consumer's content access device, potentially impacting the synchronized delivery of additional real-time inputs. To mitigate this issue, the system employs various techniques and technologies to minimize latency and ensure a seamless content experience.

At block 1104 of FIG. 11, the system can generate unique real-time commentary using AI chatbots and algorithms. These chatbots and algorithms can leverage the selected broadcast content, along with all additional real-time inputs, to create insightful and engaging commentary in real-time. By analyzing the broadcasted event, the system can generate dynamic and contextually relevant commentary that enhances the consumer's understanding and enjoyment of the sporting event. For example, the AI chatbot can provide expert analysis, share interesting facts, or offer historical context based on the specific actions and developments during the game.

In some embodiments, a transform such as GPT or BERT can be utilized to implement a chatbot or algorithm. In some embodiments, the system can incorporate other additional or alternative real-time inputs, combined with AI-driven commentary, to enhance the overall experience of the sporting event content application. In certain embodiments, users can access enriched content, including highlights, real-time analysis, personalized commentary, and augmented reality features, seamlessly integrated with the televised broadcast. This integration provides a comprehensive and immersive experience, empowering users to engage with the sporting event in an interactive and captivating manner. The system can dynamically present statistics, such as player rankings, team performance trends, or real-time scores, alongside the broadcast, enhancing the viewers' understanding and enjoyment of the game. Additionally, it can offer interactive features, such as live polls, trivia, or predictions, allowing users to actively participate and compete with other fans in real-time.

In some embodiments, at block 1104, the system can additionally or alternatively provide a personalized and dynamic experience, such as in one or more non-limiting examples: by retrieving and incorporating live social media feeds showcasing fan reactions, viral posts, or social media interactions related to the event, real-time weather updates, stadium conditions, or other environmental factors that can influence the game, sensor data from equipment or wearables used by athletes, providing insights into biometrics, motion tracking, or performance metrics, etc. Additional examples of AI-driven enhancements and features that may be incorporated into the systems and methods can include (but are not limited to): AI-powered language processing to generate real-time multilingual commentary or provide translations for international broadcasts; virtual and augmented reality elements that overlay graphics, player statistics, or virtual replays onto the live broadcast; advanced audio processing techniques to enhance crowd noise, capture ambient sounds, or provide immersive 3D audio experiences, etc.

In some embodiments, block 1104 can include one or more process steps in which the system can integrate real-time social media feeds related to the sporting event. In some embodiments, the system and method can monitor popular platforms (e.g., TWITTER, INSTAGRAM, FACEBOOK, etc.) for trending topics, fan reactions, player updates, and the like. In some embodiments, the systems and methods can monitor social media inputs in real-time, and generate audio or video highlights showcasing notable fan moments, viral posts, or social media interactions. Adding a social element to the sporting event experience can also provide users with unique and engaging content derived from real-time social media conversations.

Some embodiments can include additional aspects that leverage AI-powered statistical analysis tools to process real-time data from the sporting event. In some embodiments, the system can monitor data feeds such as player statistics, game progress, and historical records, and can generate statistical highlights and insights in real-time. In a non-limiting example, the system can provide dynamic graphics overlaying on-screen statistics, such as player performance trends, team comparisons, or historical milestones. Such real-time statistical highlights can enhance the viewers' understanding of the game and provide deeper insights into the players' performances.

Some embodiments can include additional aspects that integrate real-time inputs from expert analysts or commentators who are remotely connected to the event. These analysts can provide live commentary and insights based on their expertise and analysis of the ongoing game. Through audio or video streaming, viewers can receive personalized and knowledgeable commentary that adds depth and context to the sporting event. The system can also dynamically incorporate relevant statistics, player profiles, or historical data to augment the commentary, enriching the viewers' understanding and engagement with the game.

At block 1106 the system can implement one or more augmented reality (AR) aspects in the content delivery process. AR technology can be utilized to overlay virtual elements onto the real-world environment, enhancing the consumer's visual experience. The system can utilize AI algorithms to analyze the broadcasted event and additional real-time inputs, generating virtual overlays that can provide additional information, highlight key moments, or display statistics in real-time. In a non-limiting example, the consumer can see player profiles, live statistics, or interactive visualizations overlaid on their screen while watching the sporting event.

At block 1108, the system can generate AI-enhanced audio. In some embodiments, AI algorithms enhance the audio experience by applying advanced techniques to the broadcasted audio and additional real-time inputs. The system can analyze the audio content, remove background noise, improve clarity, or add immersive sound effects to create a more engaging and enjoyable audio experience. For example, the AI algorithms can enhance the crowd sounds, amplify the cheers or chants, or provide spatial audio effects that make the consumer feel as if they are present at the sporting event.

In some non-limiting examples, in a basketball game, as the action unfolds on the court, the system's AI chatbot generates real-time commentary, offering insights into the strategies employed by the teams, highlighting exceptional plays, and providing historical context. The chatbot's commentary is tailored to the specific game and the consumer's preferences, delivering a unique and personalized experience.

In a football match, the AR technology overlays real-time statistics, player profiles, and tactical formations on the consumer's screen. As the consumer watches the game, they can access detailed player statistics, such as passing accuracy, distance covered, or goal-scoring records, enhancing their understanding of the players' performances.

During a tennis tournament, the AI-enhancing audio algorithms analyze the broadcasted audio feed and apply noise reduction techniques, ensuring clear and immersive sound. Additionally, the algorithms can add subtle ambient sounds, such as the sound of the ball hitting the racket or the crowd's reactions, making the consumer feel more connected to the live event.

The system is not limited to these examples and can adapt to different sports and events, providing a wide range of AI-driven features to enhance the content experience. By addressing latency and leveraging AI chatbots, augmented reality, and AI-enhancing audio, the system offers consumers a unique and immersive perspective on the sporting event, delivering personalized commentary, visual overlays, and enhanced audio in real-time.

At block 1110 in FIG. 11, the system establishes synchronization of the generated real-time commentary, augmented reality overlays, and AI-enhancing audio with the monitored broadcasted event. The system compares the timing and sequencing of the generated content with the broadcasted event to ensure precise alignment.

To achieve synchronization, the system can employ some or all of the following advanced techniques. At block 1110, the system may match the timestamps and time codes of the generated real-time commentary, augmented reality overlays, and AI-enhancing audio with the corresponding moments in the monitored broadcasted event. This precise timing alignment guarantees that the additional content seamlessly integrates with the live event, providing an immersive and synchronized experience for the consumer. Additionally or alternatively at block 1110 of FIG. 11, the system may utilize machine learning algorithms to analyze the broadcasted event and the generated content, identifying key events, patterns, and cues to establish synchronization points. By learning from past matches and events, the algorithms adapt and make intelligent predictions to ensure optimal alignment between the real-time content and the live broadcast. Additionally or alternatively at block 1110 of FIG. 11, the system may analyze the timing data of the generated content and the monitored broadcast, interpolating any discrepancies to achieve smooth and accurate synchronization. If there are minor variations or delays, the system applies data interpolation to align the content precisely with the corresponding moments in the live sporting event.

Through the combination of precise timing alignment, machine learning algorithms, and data interpolation techniques, the system ensures that the generated real-time commentary, augmented reality overlays, and AI-enhancing audio remain in perfect synchronization with the monitored broadcasted event. This synchronization guarantees a seamless and immersive content experience for the consumer, where the additional content aligns precisely with the live sporting event they are observing.

At block 1112, the synchronized enhanced content, comprising the monitored broadcasted event, the generated real-time commentary, augmented reality overlays, and AI-enhancing audio, is transmitted from the storage location to the content access device via the network. The system can stream the content in real-time or deliver pre-packaged segments for on-demand consumption. The content may include synchronized audio commentary, augmented reality visual overlays, or enhanced audio effects that enrich the consumer's experience. Finally, at block 1114, the synchronized enhanced content is delivered by the content access device to the user.

Thereby, the process flow depicted at FIG. 11 implements an enhanced content delivery process addressing latency and incorporating AI chatbots and algorithms for generating unique real-time commentary, augmented reality overlays, and AI-enhancing audio. By minimizing latency, leveraging AI technologies, and ensuring synchronization, the system provides consumers with a personalized, immersive, and synchronized content experience that enhances their enjoyment and understanding of the sporting event.

In one or more techniques, content may be provided to the consumer via at least two ways. For example, the consumer may use a voice command to access content, and/or the consumer may use one or more applications. For example, a voice command may be "Alexa, play SportSide™", and/or "Hey Google, play SportSide™", and/or the like. In one or more techniques, the sporting event content application(s) may interact with a smart speaker to provide the sporting event content.

For example, a consumer may activate the sporting event content application via a smart speaker and/or a mobile device. The smart speaker and/or the mobile device may receive an audio feed from the device via which the consumer is viewing and/or listening to a broadcast of a sporting event (e.g., real time, delayed, and/or previously recorded). The smart speaker and/or the mobile device may time encode the sampled audio feed (e.g., with a universal clock service, GPS, or the like). The application may command the smart speaker and/or the mobile device to search for one or more sporting event content files on a remote storage location/library that corresponds to the sampled audio feed. Perhaps based on the time code of the sampled audio feed, a time alignment/synchronization may be performed on one or more indicated sporting event content files. The application may cause the one or more indicated sporting event content files to stream to the smart speaker and/or the mobile device. The sporting event content stream may be time adjusted using the synchronization such that the streamed sporting event content may be in substantial timing alignment with the broadcast of the sporting event.

For example, a consumer may activate the sporting event content application via a smart speaker and/or a mobile device. The smart speaker and/or the mobile device may receive a video feed from the device via which the consumer is viewing and/or listening to a broadcast of a sporting event (e.g., real time, delayed, and/or previously recorded). The smart speaker and/or the mobile device may time encode the sampled video feed (e.g., with a universal clock service, GPS, or the like). The application may command the smart speaker and/or the mobile device to search for one or more sporting event content files on a remote storage location/library that corresponds to the sampled video feed. Perhaps based on the time code of the sampled video feed, a time alignment/synchronization may be performed on one or more indicated sporting event content files. The application may cause the one or more indicated sporting event content files to stream to the smart speaker and/or the mobile device. The sporting event content stream may be time adjusted using the synchronization such that the streamed sporting event content may be in substantial timing alignment with the broadcast of the sporting event.

In one or more techniques, a voice command may be a more useful way to gain general access to (e.g., high-level) sporting event content. Engaging sporting event content from an in-home smart speaker's application may unlock one or more enhancements that may include one or more of: general courtside audio, celebrity commentary, and/or virtual reality (VR) overlays, among other enhancements, for example.

One or more of the enhancements may have an associated financial charge (e.g., up-charge) that may provide revenue sharing opportunity incentives. In one or more techniques, perhaps hundreds of "celebrity" commentaries could be available from one or more of: Hollywood, YouTube, Instagram, Twitter stars, and/or international stars, among others, perhaps bringing entirely new audiences to the sporting event (e.g., professional basketball) via the sporting event content experience.

In one or more techniques, a "Friends and Family" mode of the sporting event application may allow at least one consumer to invite one or more other consumers to experience a game together. For example sporting event content audio may play in the background of the experience, while the connected microphones may remain open allowing the one or more consumers to talk to each other about the game (e.g., in real-time) through the smart speaker devices/network. The sporting event content application may coordinate/configure the network of consumer's smart speakers and/or mobile devices for the "conference" experience. In one or more techniques, this "conference" experience can be setup, perhaps for example as long as the invited consumers are able to view the same sporting event broadcast at substantially similar times. In one or more techniques, it may be useful for the "conference" feature for one or more, or each, individual sporting event content delivery to be in relatively close synchronization (sync).

In one or more techniques, the sporting event content might not require any changes to a conventional broadcast of the sporting event. In one or more techniques, the sporting event content may provide one or more respective sports players a channel to build their brand with one or more consumers directly. One or more techniques may allow one or more consumers to experience one or more aspects (e.g., sights and/or sounds) of the sporting event that few sports fans may ever see and/or hear, perhaps in some instances, even sports fans who attend the sporting event live and in person.

One or more techniques may provide one or more advertisers the ability to interact with numerous consumers and/or may provide the advertisers to (e.g., directly) fulfill one or more products/services/information that a consumer may order and/or may make an inquiry regarding.

While the present disclosure has been illustrated and described in detail in the drawings and foregoing description, the same is to be considered as illustrative and not restrictive in character, it being understood that only certain embodiments have been shown and described, and that all changes and modifications that come within the spirit of the present disclosure are desired to be protected.

What is claimed is:

1. A system for delivering enhanced content in real-time during a sporting event, comprising:
   a) a content access device configured to receive a request for enhanced content from a consumer, wherein the request specifies desired real-time inputs to enhance the consumer's sporting event experience;
   b) a storage location comprising one or more artificial intelligence (AI) services and/or systems for generating one or more real-time audio highlights, video clips, and/or statistical insights based on the sporting event, wherein the storage location is configured to:
      (i) retrieve the real-time inputs requested by the consumer and synchronizes them with a monitored broadcasted event;
      (ii) generate predictive analytics that identify one or more in-game events during the sporting event by applying one or more AI algorithms, the predictive analytics based on the real-time inputs; and
      (iii) generate synchronized enhanced content comprising one or more augmented reality overlays that are automatically generated by the storage location independent from user input, in response to the identification of the in-game events, that display player statistics, team metrics, or virtual replays based on the predictive analytics on the content access device in real-time; and
   c) a network connecting the content access device and the storage location, enabling transmission of the synchronized enhanced content from the storage location to the content access device in real-time during the sporting event.

2. The system of claim 1, further comprising an AI chatbot integrated into the content access device, generating real-time commentary based on the monitored broadcasted event and the real-time inputs, providing analysis and/or historical context during the sporting event.

3. The system of claim 1, further comprising an augmented reality (AR) feature integrated into the content access device, overlaying virtual elements onto the live broadcast of the sporting event, enhancing visual experience by providing additional information, statistics, and/or visualizations in real-time.

4. The system of claim 1, wherein the real-time audio highlights generated by the storage location comprise simulated voices providing dynamic commentary throughout the sporting event.

5. The system of claim 1, wherein the video clips generated by the storage location are identified using computer vision, to identify one or more in-game events occurring in real-time during the sporting event.

6. The system of claim 1, wherein the statistical insights generated by the storage location include one or more selected from: player performance metrics, team statistics, historical trends, and predictive modeling, adapted to enhance viewing with statistical information during the sporting event.

7. The system of claim 1, wherein the storage location further comprises one or more AI processes for noise reduction to enhance audio clarity and image processing algorithms to improve video quality during the sporting event.

8. The system of claim 1, wherein the synchronized enhanced content comprises video clips and/or analysis generated utilizing one or more AI processes and presented in real-time during the sporting event.

9. A method for delivering enhanced content in real-time during a sporting event, comprising:
   a) receiving a request for enhanced content from a consumer, wherein the request specifies desired real-time inputs to enhance the consumer's sporting event experience;
   b) retrieving the requested real-time inputs from a storage location comprising one or more artificial intelligence (AI) services and/or systems designed to generate one or more real-time audio highlights, video clips, and/or statistical insights based on the sporting event;
   c) synchronizing the real-time inputs with a monitored broadcasted event to ensure temporal alignment;
   d) generating predictive analytics that identify one or more in-game events during the sporting event by applying one or more AI algorithms, the predictive analytics based on the real-time inputs, and
   e) generating synchronized enhanced content comprising one or more augmented reality overlays that are automatically generated by the storage location independent from user input, in response to detection of one or more events during the sporting event, that display player statistics, team metrics, or virtual replays based on the predictive analytics on the content access device in real-time;
   f) transmitting the synchronized enhanced content in real-time from the storage location to a content access device via a network; and
   g) delivering the synchronized enhanced content to the consumer during the sporting event.

10. The method of claim 9, further comprising generating unique real-time commentary using an AI chatbot or algorithm based on the monitored broadcasted event and the additional real-time inputs, providing insightful analysis and historical context during the sporting event.

11. The method of claim 9, further comprising overlaying virtual elements onto the live broadcast of the sporting event using an augmented reality (AR) feature, enhancing visual experience by providing additional information, statistics, and/or visualizations in real-time.

12. The method of claim 9, wherein the real-time audio highlights generated by the storage location comprise simulated voices providing dynamic commentary throughout the sporting event.

13. The method of claim 9, wherein the video clips generated by the storage location are identified using computer vision, to identify one or more in-game events occurring in real-time during the sporting event.

14. The method of claim 9, wherein the statistical insights generated by the storage location include one or more selected from: player performance metrics, team statistics, historical trends, and predictive modeling, adapted to enhance viewing with statistical information during the sporting event.

15. The method of claim 9, further comprising applying one or more AI processes for noise reduction to enhance audio clarity and image processing algorithms to improve video quality during the sporting event.

16. The method of claim 9, wherein the synchronized enhanced content comprises video clips and/or analysis generated utilizing an AI process and presented in real-time during the sporting event.

17. A device for providing event content comprising one or more content enhancements, comprising:
   a) a content access device configured to receive event content from a source;
   b) a storage location comprising AI services and systems for generating content enhancements based on the event content,
   wherein the AI services and systems are configured to generate predictive analytics that identify one or more in-game events during the sporting event by applying one or more AI algorithms, the predictive analytics based on the real-time inputs, and generate synchronized enhanced content comprising one or more augmented reality overlays that are automatically generated by the storage location independent from user input, in response to detection of one or more events during the sporting event, that display player statistics, team metrics, or virtual replays based on the predictive analytics on the content access device in real-time, and wherein the content enhancements comprise the synchronized enhanced content; and
   c) a user interface for presenting the event content with the content enhancements to a user.

18. The device of claim 17, wherein the content enhancements comprise real-time audio commentary, visual overlays, or statistical analyses generated by one or more artificial intelligence (AI) processes.

19. The device of claim 17, further comprising an augmented reality (AR) feature that overlays virtual elements onto the event content, providing one or more enhanced visualizations to the user.

20. The device of claim 17, wherein the storage location includes one or more AI processes for noise reduction or image processing to enhance the audio and/or visual quality of the event content.

* * * * *